United States Patent
Abfall et al.

(10) Patent No.: US 9,813,797 B2
(45) Date of Patent: Nov. 7, 2017

(54) SYSTEM AND METHOD FOR THE PROTECTION AND STORAGE OF SMALL ELECTRONIC COMPONENTS

(71) Applicants: Tony Abfall, Mount Prospect, IL (US); Elisabeth Abfall, Mount Prospect, IL (US); Collin Anderson, Arlington Heights, IL (US)

(72) Inventors: Tony Abfall, Mount Prospect, IL (US); Elisabeth Abfall, Mount Prospect, IL (US); Collin Anderson, Arlington Heights, IL (US)

(73) Assignee: Digital Innovations LLC, Arlington Heights, IL (US)

( * ) Notice: Subject to any disclaimer, the term of this patent is extended or adjusted under 35 U.S.C. 154(b) by 94 days.

(21) Appl. No.: 14/667,449

(22) Filed: Mar. 24, 2015

(65) Prior Publication Data

US 2015/0304756 A1    Oct. 22, 2015

Related U.S. Application Data

(63) Continuation of application No. 13/657,480, filed on Oct. 22, 2012.

(60) Provisional application No. 61/550,963, filed on Oct. 25, 2011.

(51) Int. Cl.
| | |
|---|---|
| *H04R 1/10* | (2006.01) |
| *B65H 75/14* | (2006.01) |
| *H02G 11/02* | (2006.01) |
| *B65H 75/40* | (2006.01) |

(52) U.S. Cl.
CPC ......... *H04R 1/1033* (2013.01); *B65H 75/143* (2013.01); *B65H 75/40* (2013.01); *H02G 11/02* (2013.01); *B65H 2701/3919* (2013.01)

(58) Field of Classification Search
CPC .... H02G 11/02; B65H 75/143; B65H 75/406; B65H 2701/3919; B65H 2701/34; H04R 1/1033
USPC ...... 242/580, 588.1, 588.3, 405, 405.1, 129, 242/601, 613, 614
See application file for complete search history.

(56) References Cited

U.S. PATENT DOCUMENTS

| | | | | | |
|---|---|---|---|---|---|
| 2,319,731 | A | * | 5/1943 | Garrett .................. | H02G 11/02 242/388 |
| 2,533,731 | A | * | 12/1950 | Gomberg ............... | B65H 49/08 242/118.5 |
| 2,952,420 | A | * | 9/1960 | Von Hoorn .......... | B65H 75/406 24/909 |
| 3,062,475 | A | * | 11/1962 | Miller, Jr. ............. | A01K 97/06 242/404.3 |

(Continued)

*Primary Examiner* — Emmanuel M Marcelo
*Assistant Examiner* — Michael Gallion
(74) *Attorney, Agent, or Firm* — Clifford H. Kraft

(57) ABSTRACT

A small case that can be injection-molded from liquid silicone rubber or a similar elastomer that protects earbuds or other components from damage and manages the wire to prevent tangling. The case has an integral pocket that holds most styles of earbuds or other items with several optional fingers that are flexible and compliant. The earbuds or other component can be inserted into the pocket and the fingers close over the earbuds or other items thereby protecting and/or retaining them. The wires can then be fed through one of the slots and wrapped around a spool. A reversible cover can then be flipped to a closed position to cover and retain the wire.

9 Claims, 6 Drawing Sheets

(56) References Cited

U.S. PATENT DOCUMENTS

| | | | | |
|---|---|---|---|---|
| 3,430,886 A * | 3/1969 | Sweeney | | A01K 89/00 |
| | | | | 242/118.41 |
| 4,150,798 A * | 4/1979 | Aragon | | H02G 11/02 |
| | | | | 191/12.2 R |
| 4,390,142 A * | 6/1983 | Cheng | | H02G 11/02 |
| | | | | 242/388.1 |
| 4,428,546 A * | 1/1984 | Weideman | | B65H 75/22 |
| | | | | 242/578.1 |
| 4,634,076 A * | 1/1987 | Eckert | | B65H 75/14 |
| | | | | 206/403 |
| 4,802,638 A * | 2/1989 | Burger | | B65H 75/143 |
| | | | | 242/388.1 |
| 4,901,938 A * | 2/1990 | Cantley | | B65H 75/44 |
| | | | | 242/378.1 |
| 5,188,314 A * | 2/1993 | Peters | | A63H 27/002 |
| | | | | 188/65.1 |
| 5,280,861 A * | 1/1994 | Corriveau | | B65H 75/28 |
| | | | | 242/586 |
| 5,294,068 A * | 3/1994 | Baro | | B26F 3/02 |
| | | | | 206/405 |
| 5,855,262 A * | 1/1999 | Jackson | | B60L 11/1816 |
| | | | | 191/12.4 |
| 5,873,540 A * | 2/1999 | Hardin | | B65H 75/143 |
| | | | | 206/406 |
| 5,984,224 A * | 11/1999 | Yang | | B65H 75/4473 |
| | | | | 242/400.1 |
| 5,992,787 A * | 11/1999 | Burke | | H02G 11/02 |
| | | | | 206/409 |
| 6,253,893 B1 * | 7/2001 | Chi-Min | | H01R 12/592 |
| | | | | 174/113 R |
| D462,890 S * | 9/2002 | Brown | | D8/356 |
| 6,554,218 B2 * | 4/2003 | Buyce | | B65H 75/143 |
| | | | | 242/388.6 |
| 6,600,479 B1 * | 7/2003 | Smith | | G06F 3/03543 |
| | | | | 345/156 |
| 6,612,515 B1 * | 9/2003 | Tinucci | | B65H 49/38 |
| | | | | 206/397 |
| 6,616,080 B1 * | 9/2003 | Edwards | | A45C 7/0045 |
| | | | | 191/12.2 R |
| 7,032,854 B2 * | 4/2006 | Marsden | | H02G 11/02 |
| | | | | 242/388.1 |
| 7,438,258 B2 * | 10/2008 | Chen | | B65H 75/14 |
| | | | | 191/12.2 R |
| 7,654,484 B2 * | 2/2010 | Mogensen | | A61M 5/1418 |
| | | | | 242/402 |
| D631,730 S * | 2/2011 | Skillman | | D8/356 |
| 8,091,820 B2 * | 1/2012 | Thorn | | B65H 75/143 |
| | | | | 242/388.1 |
| D662,494 S * | 6/2012 | Frey | | D14/223 |
| 8,230,995 B2 * | 7/2012 | Andrews | | A01D 34/416 |
| | | | | 206/403 |
| D674,271 S * | 1/2013 | Rodwin | | D8/356 |
| D692,293 S * | 10/2013 | Toscani | | D8/356 |
| D701,448 S * | 3/2014 | Rodwin | | D8/356 |
| 8,720,657 B2 * | 5/2014 | Kramer | | H02G 11/02 |
| | | | | 191/12.2 R |
| 2002/0145073 A1 * | 10/2002 | Swanson | | A61F 15/002 |
| | | | | 242/588.3 |
| 2003/0038209 A1 * | 2/2003 | Remeczky | | B65H 75/143 |
| | | | | 242/610.6 |
| 2003/0122023 A1 * | 7/2003 | Pitcher | | B65H 75/143 |
| | | | | 242/388.1 |
| 2004/0045851 A1 * | 3/2004 | Watari | | A45C 11/00 |
| | | | | 206/409 |
| 2006/0006038 A1 * | 1/2006 | Beverlin | | B65H 75/406 |
| | | | | 191/12.2 R |
| 2006/0196989 A1 * | 9/2006 | Bartley | | B65H 49/08 |
| | | | | 242/601 |
| 2007/0251786 A1 * | 11/2007 | Wegner | | B65H 75/28 |
| | | | | 191/12.2 R |
| 2008/0156916 A1 * | 7/2008 | DeLuca | | B65H 49/327 |
| | | | | 242/171 |
| 2010/0264244 A1 * | 10/2010 | Spencer | | B65H 75/28 |
| | | | | 242/378 |
| 2011/0036676 A1 * | 2/2011 | Skillman | | B65H 75/143 |
| | | | | 191/12.4 |
| 2011/0095119 A1 * | 4/2011 | Thorn | | B65H 75/143 |
| | | | | 242/388.1 |
| 2011/0123050 A1 * | 5/2011 | Garra | | B65H 75/4473 |
| | | | | 381/123 |
| 2011/0203954 A1 * | 8/2011 | Kroupa | | B65H 75/4431 |
| | | | | 206/320 |
| 2013/0075522 A1 * | 3/2013 | Penumatcha | | B65H 75/14 |
| | | | | 242/614 |
| 2013/0168486 A1 * | 7/2013 | Abfall | | H04R 1/1033 |
| | | | | 242/588.3 |
| 2013/0221145 A1 * | 8/2013 | Reynolds | | B65H 75/143 |
| | | | | 242/125.2 |
| 2013/0284843 A1 * | 10/2013 | Mertesdorf | | B65H 75/4402 |
| | | | | 242/397 |
| 2014/0131505 A1 * | 5/2014 | Gonzalez | | B65H 49/08 |
| | | | | 242/588.2 |
| 2014/0339353 A1 * | 11/2014 | Killen | | A61F 2/3676 |
| | | | | 242/557 |

* cited by examiner

SYSTEM AND METHOD FOR THE PROTECTION AND STORAGE OF SMALL ELECTRONIC COMPONENTS

This is a continuation of application Ser. No. 13/657,480 filed Oct. 22, 2012 which was related to and claimed priority to U.S. provisional patent application No. 61/550,963 filed Oct. 25, 2012. Application Ser. Nos. 13/657,480 and 61/550, 963 are hereby incorporated by reference in their entirety.

BACKGROUND

Field of the Invention

The present invention relates generally to the field of protective cases and more particularly to a protective case for an earbud type earphone.

Description of the Prior Art

Earbuds are small earphones with cables that are typically used with MP3 players, smartphones and the like. A single earbud typically is inserted into a single ear with a pair of earbuds on a single cable providing a complete set of earphones. A tremendous problem with earbuds is that they are not protected, and are hence easily damaged, and their wires get tangled up when they are not being used.

It would be extremely advantageous to have a protective case for earbuds or other small components with wires or cables that would be soft and easily carried; would quickly open to insert the earbuds or device; allow their easy removal; and that would also provide a way to store the wires or cables.

SUMMARY OF THE INVENTION

The present invention relates to a small case that can be injection-molded from liquid silicone rubber or an elastomer or other polymer that protects the earbuds from damage and manages the wire to prevent tangling. The case of the present invention has an integral pocket that holds most styles of earbuds or other small device with a spool and/or several retention fingers that can have various designs and shapes. The earbuds can be inserted into the pocket, and the fingers prevent the earbuds from coming out on their own. The wires can then be fed through one of the slots and wrapped around a spool. The slots can be of various widths to accommodate a variety of wire sizes. The connector end of the wire can be placed into the center pocket or around the spool. The reversible cover can then be flipped to a closed position to cover and retain the wire. To remove the earbuds, it is only necessary to pull on the connector end of the wire with the cover in the closed position. The wire or cable will de-reel without tangles similar to a fishing reel. The device or earbuds can also optionally be pulled out directly with the cable.

DESCRIPTION OF THE FIGURES

Attention is now directed to several drawings that display features of the present invention.

Several drawings and illustrations have been presented to aid in understanding the present invention. The scope of the present invention is not limited to what is shown in the figures.

DESCRIPTION OF THE PREFERRED EMBODIMENT

The present invention relates to an earbud case that has a plurality of fingers forming a pocket in which earbuds, cable ends, etc. can be inserted. A reversible cover can be flipped open to allow the earbud wires, cables, etc. to be wound around a spool member. The cover can then be reversed to close around the wire. The case is not limited to earbuds and cables as it can be used to store jewelry, fishing apparatus or any other items having wires, chain, fishing line, etc. which have a tendency to become tangled.

Figure 1:
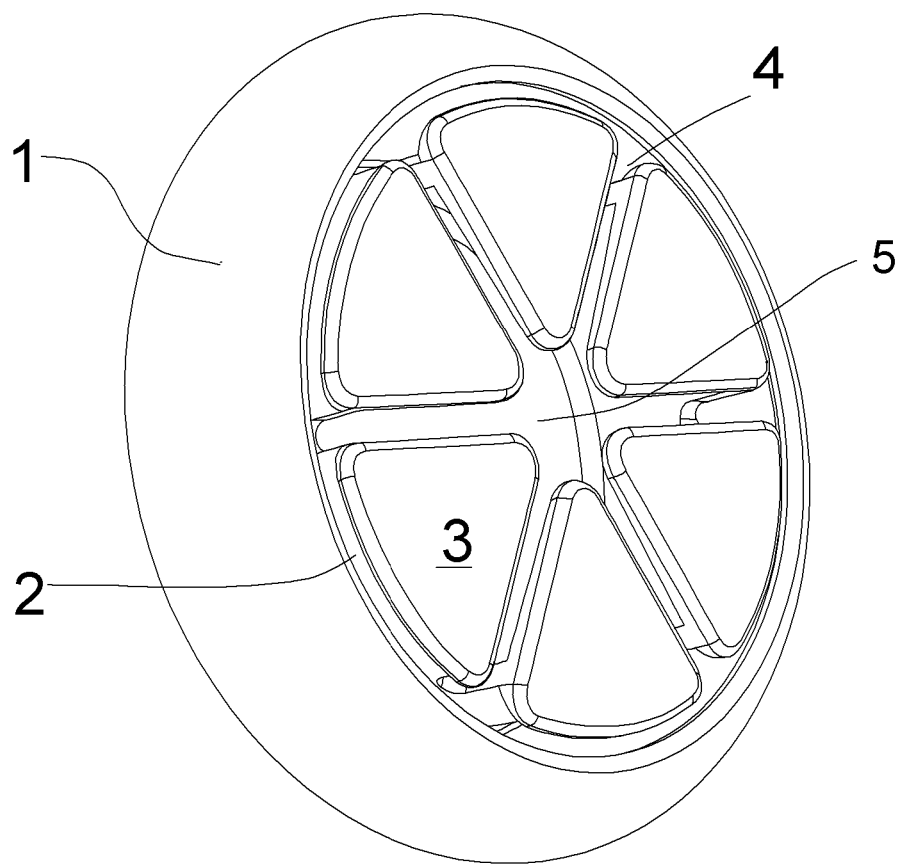
FIG. 1 shows a front perspective view of an embodiment of the earbud case in a totally closed position.
Figure 2:
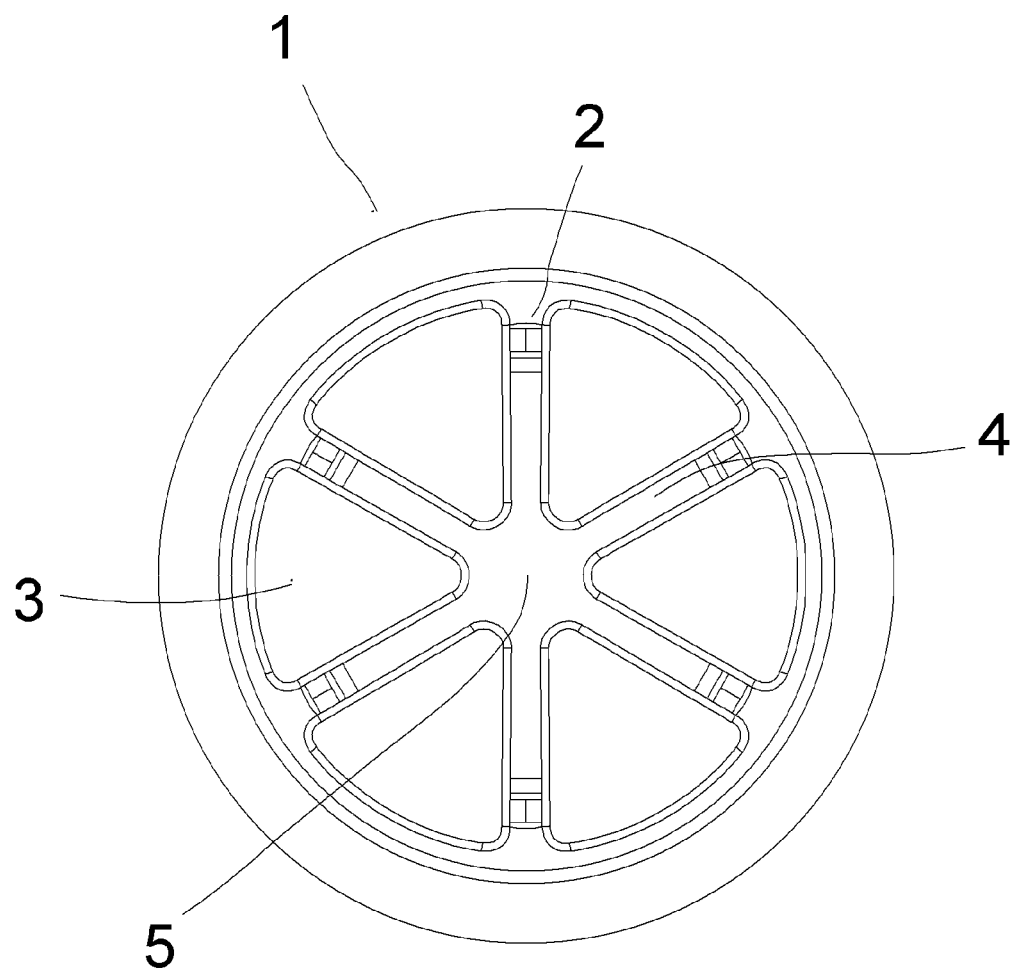
FIG. 2 shows the embodiment of FIG. 1 in a closed position directly from the front.

FIG. 1 shows an embodiment of the present invention in a totally closed position. The reversible cover 1 is closed around an inner spool member 2. A set of rubber fingers 3 are connected to the top of a spool having several slots 4. This particular arrangement causes the fingers 3 to protect and assist in retaining any item that is placed inside the pocket. FIG. 2 shows a direct front view of the configuration of FIG. 1. The fingers 3 are arranged such that they can protect and help retain a captured earbud or any other item that the user would like to store.

Figure 3:
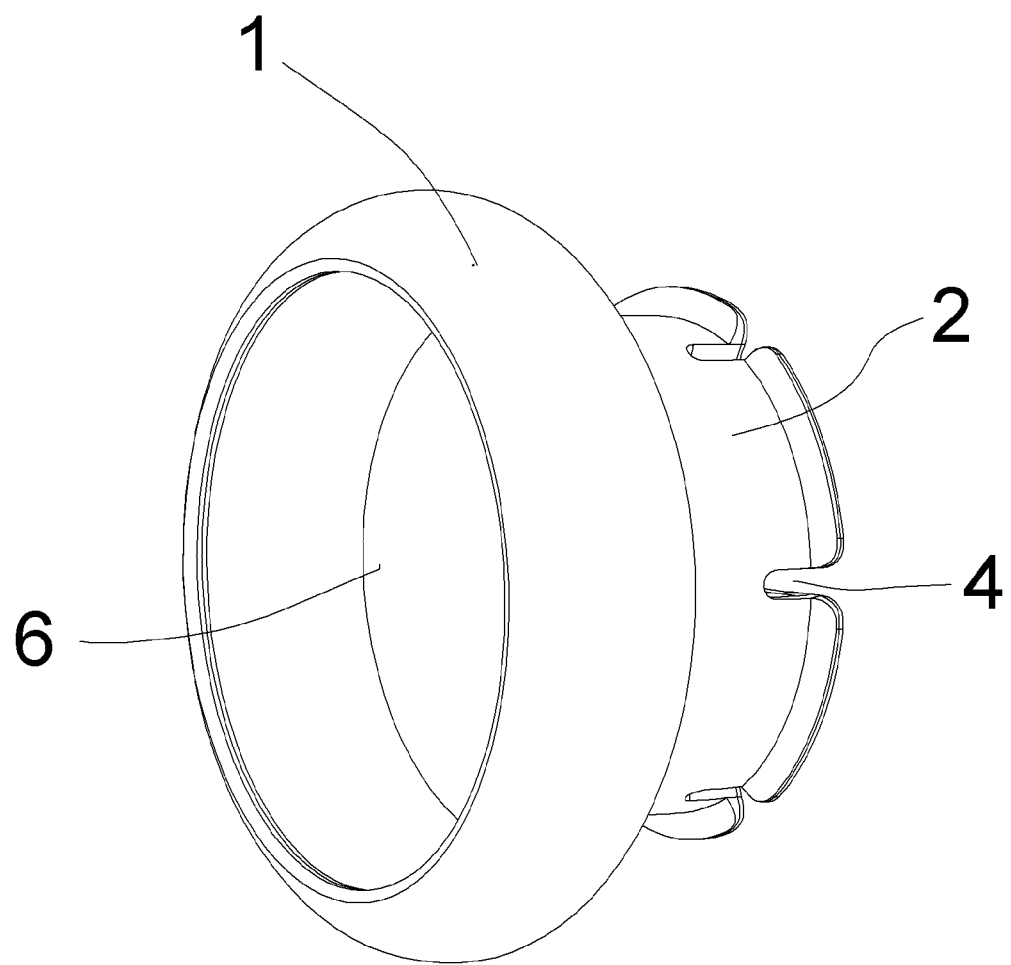
FIG. 3 shows a rear perspective view of the embodiment of FIG. 1 with the reversible cover in the open position.
Figure 4:
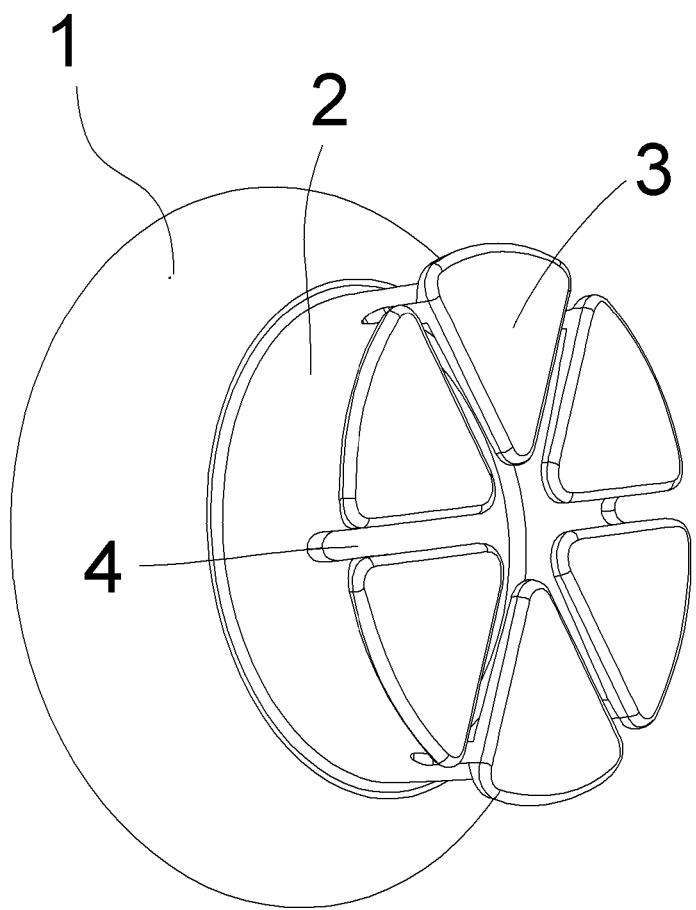
FIG. 4 shows a front view of the configuration of FIG. 3.

FIG. 3 shows the reversible cover 1 in the open position exposing the spool member 2 which is also the outer wall of the pocket. The fingers 3 and slots 4 are shown in the closed position. FIG. 4 shows a rear view of the configuration of FIG. 3. The reversed cover 1 can clearly be seen peeled back beyond the bottom 6 of the pocket. The spool 2 and the edges of the fingers 3 can be seen.

Figure 5:
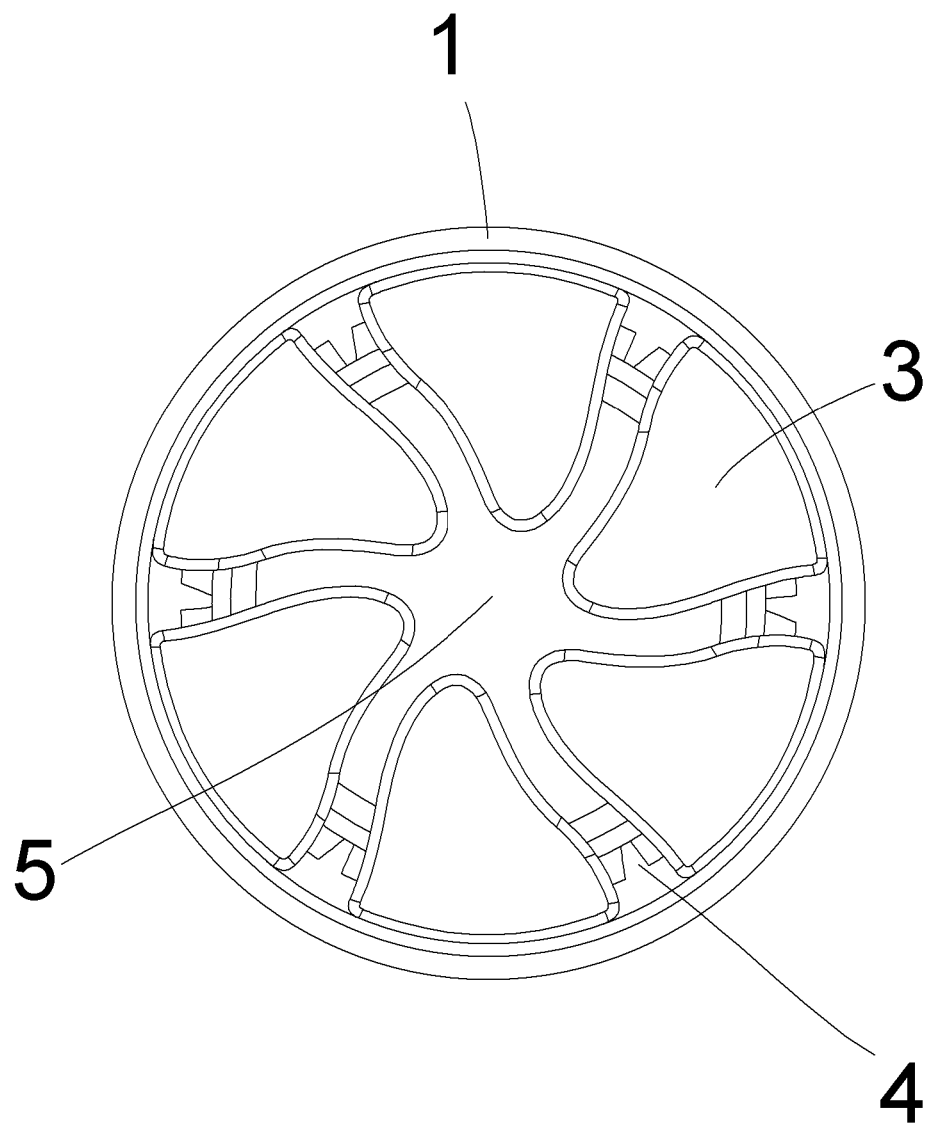
FIG. 5 shows a different embodiment in a closed position.

FIG. 5 shows an alternate embodiment of the present invention with fingers that follow a curved contour. This is a design element. The fingers can be designed in a variety of shapes and sizes but the purpose of protecting and retaining various items within the formed pocket remains the same.

Figure 6A:
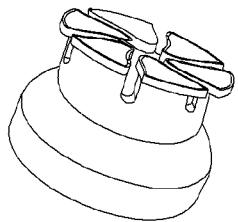
FIG. 6A shows the case in an open position.
Figure 6B:
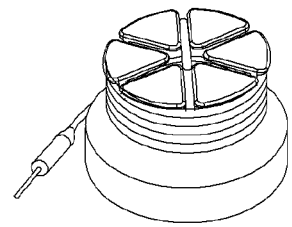
FIG. 6B shows the earbud cable wound on the spool.
Figure 6C:
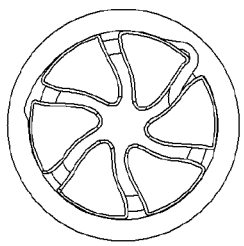
FIG. 6C shows the case with earbud and cable totally closed for storage.
Figure 6D:
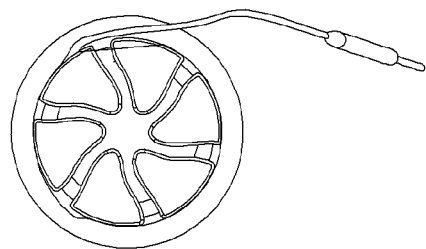
FIG. 6D shows how the cable can be unwound when it is desired to remove the earbud.

FIGS. 6A-6D show the use of the device. To use the present invention, the user peels back the cover 1 to expose the spool 2. FIG. 6A shows the device in this configuration. The fingers create a pocket 5 in which earbuds or other items can be inserted 5. The earbud wires or cables can be wrapped around the spool 2 in either direction as shown in FIG. 6B and the cover 1 flipped back to the normal position where it closes around the wires as shown in FIG. 6C. The earbud jack can either be placed in one of the slots 4 or contained under the cover 1. To remove the earbuds, the user simply pulls on the jack to unwind the wire from the spool 2 (similar to a spinning reel used in fishing) as shown in FIG. 6D. The cover 1 can then be closed for storage. If the cable contains an in-line microphone or other stiff member, that can be placed in the slots in the spool, or left outside the spool.

The device of the present invention can be supplied in a variety of colors and sizes as needed for earbuds and other similar devices. The features of the invention can be integrated into cases for other electronic devices that require earbuds or can be used to store other devices.

The preferred material is injection-molded liquid silicone rubber or other elastomer rubber, or flexible polymer. In general any rubbery or pliable material may be used. The device can be packaged conveniently and sold as a unit ready to use.

Several descriptions and illustrations have been provided to aid in understanding the present invention. One with skill in the art will realize that numerous changes and variations can be made without departing from the spirit of the invention. Each of these changes and variations are within the scope of the present invention.

The invention claimed is:

1. A pliable device for storing earbuds that have a connection wire with a connection jack, the device comprising:
    a flexible cover made from a non-rigid flexible material adapted to cover a non-rotating hollow spool, the spool member configured to spool the connection wire on an outer surface by hand winding, the spool having a hollow interior to receive and stores earbuds in the hollow interior;
    a plurality of flat flexible fingers attached to a distal end of the spool, the fingers covering the hollow interior of the spool, the fingers yielding elastically to allow insertion and removal of earbuds into and out of the hollow interior of the spool;
    the flexible cover being reversible, folding away from the spool exposing the outer surface of the spool in an open configuration, and folding back over the spool in a closed configuration covering the outer surface of the spool;
    with the flexible cover in the open configuration, the plurality of flat fingers being flexible and compliant allowing insertion of earbuds into the hollow interior of the spool, and following said insertion, the fingers closing over the earbuds protecting the earbuds, wherein the connection wire can then be wound around the outer surface of the spool and then retained and protected by folding the flexible cover to the closed configuration;
    and wherein the connection wire can be unspooled by pulling it without opening the cover.

2. The device of claim 1 wherein the flexible cover peels back away from the spool to change from the closed configuration to the open configuration.

3. The device of claim 1 adapted so that after the connection wire is wound around the spool member, the connection jack can also be contained within the flexible cover in the closed configuration.

4. The device of claim 3 adapted to de-reel the connection wire from the spool member in the closed configuration when the connection wire, jack or earbud is pulled.

5. The device of claim 2 adapted so that after the connection wire is wound around the spool member, the connection jack can also be contained within the cover in the closed configuration.

6. The device of claim 5 adapted to de-reel the connection wire from the spool member in the closed configuration when the connection wire, jack or earbud is pulled.

7. The device of claim 1 made as a single piece including the flexible cover, the spool and the flat fingers.

8. The device of claim 1 wherein there are six flat flexible fingers.

9. The device of claim 1 wherein the cover and spool are made from silicon rubber or flexible thermoplastic.

\* \* \* \* \*